United States Patent [19]

Erard et al.

[11] Patent Number: 4,670,538

[45] Date of Patent: Jun. 2, 1987

[54] PROCESS FOR DEGASSING VINYL CHLORIDE-BASE POLYMERS AND COPOLYMERS PREPARED IN BULK AND POLYMERS AND COPOLYMERS HAVING AN IMPROVED SIEVING CAPABILITY RESULTING THEREFROM

[75] Inventors: Francois Erard, Ecully; Patrick le Garff, Lyons; Solomon Soussan, Saint-Symphorien d'Ozon, all of France

[73] Assignee: Chloe Chimie, France

[21] Appl. No.: 832,264

[22] Filed: Feb. 21, 1986

Related U.S. Application Data

[63] Continuation of Ser. No. 573,589, Jan. 24, 1984, abandoned, which is a continuation of Ser. No. 298,761, Sep. 2, 1981, abandoned.

[30] Foreign Application Priority Data

Sep. 8, 1980 [FR] France .................................. 80 19340

[51] Int. Cl.$^4$ ............................................... C08F 6/28
[52] U.S. Cl. .................................. 528/486; 528/487; 528/499; 528/501
[58] Field of Search ................ 528/486, 487, 499, 501

[56] References Cited

U.S. PATENT DOCUMENTS

| | | | |
|---|---|---|---|
| 3,635,928 | 1/1972 | Thomas | 528/486 |
| 4,102,844 | 7/1978 | Schwinum | 526/303 |
| 4,208,528 | 6/1980 | McClain | 528/487 |
| 4,217,444 | 8/1980 | Pompon | 528/499 |
| 4,367,331 | 1/1983 | Hager | 528/501 |

*Primary Examiner*—Christopher Henderson
*Attorney, Agent, or Firm*—Jones, Day, Reavis & Pogue

[57] ABSTRACT

A process for degassing polymers and copolymers which are prepared by bulk polymerization of a vinyl chloride-base monomer composition, in which the polymerisate is kept in an agitated condition, the monomer composition to be removed is adjusted from the polymerization pressure to an absolute pressure of less than 0.16 bar, the polymerizate is brought to or maintained at a temperature which is at least equal to 70° C. and lower than the temperature at which degradation of the polymer or copolymer begins, and said pressure and temperature conditions are maintained substantially until degassing stops. After the proportion of residual vinyl chloride monomer in the polymer or copolymer has been reduced to a value below 2000 mg/kg, the polymerizate is brought into contact with water to which at least one anionic surface active agent is added.

4 Claims, No Drawings

PROCESS FOR DEGASSING VINYL CHLORIDE-BASE POLYMERS AND COPOLYMERS PREPARED IN BULK AND POLYMERS AND COPOLYMERS HAVING AN IMPROVED SIEVING CAPABILITY RESULTING THEREFROM

CROSS REFERENCES TO RELATED APPLICATIONS

This applications is a continuation of application Ser. No. 573,589, filed Jan. 24, 1984, now abandoned, which is a continuation of application Ser. No. 298,761, filed Sept. 2, 1981, now abandoned.

INTRODUCTION

The present invention concerns a process for degassing polymers and copolymers which are prepared by bulk polymerization of a vinyl chloride-base monomer composition, and the polymers and copolymers having an enhanced sieving capability resulting therefrom. The expression 'vinyl chloride-base monomer composition' or, more shortly, 'monomer composition' is used in the present description to denote vinyl chloride alone or in mixture with at least one other monomer which is co-polymerizable with vinyl chloride. Said monomer composition contains at least 70% by weight of vinyl chloride.

BACKGROUND OF THE INVENTION

The presence of residual monomer vinyl chloride in vinyl chloride-base polymers and copolymers gives rise to disadvantages, among which the following may be mentioned; the danger of producing mixtures which detonate with the ambient air, the danger of contaminating the air in the plants where such polymers or copolymers are handled, and the danger of microballs being present in the finished articles prepared from such polymers and copolymers. Therefore, the attempt is made to reduce the proportion of residual monomer vinyl chloride therein to the minimum possible value.

When vinyl chloride-base polymers and copolymers are prepared in bulk, the resulting product, when the desired degree of conversion of the monomer composition is achieved, is a polymerizate which is subjected to a degassing treatment for separating the unreacted monomer composition from the polymers or copolymers which are produced in powder form.

DESCRIPTION OF PRIOR ART

The French Pat. No. 75 09798 which was published under the No 2 305 446 proposed a process for degassing polymers and copolymers which are prepared by bulk polymerization of a vinyl chloride-base monomer composition, for producing products which, before they are exposed to the free air, have a residual vinyl chloride monomer content which is lower than 50 mg/kg and generally lower than 20 mg/kg and which can be down to 1 mg/kg. This process comprises, while the polymerisate is maintained in an agitated condition, taking the monomer composition to be removed from the polymerization pressure to an absolute pressure of lower than 0.16 bar (120 mm of mercury), bringing or maintaining the polymerizate at a temperature which is at least equal to 70° C. and lower than the temperature at which degradation of the polymer or copolymer begins, and maintaining those pressure and temperature conditions substantially until degassing stops, the polymerizate being brought into contact with an amount of water representing from 0.01 to 0.8% and preferably from 0.05 to 0.5% of the weight thereof, after the residual vinyl chloride monomer content of the polymer or copolymer has been reduced to below 2000 mg/kg.

After degassing stops, the polymers or copolymers are adjusted to atmospheric pressure by means of an inert gas, such as nitrogen before they are brought into the free air, which is generally followed by a sieving operation.

The sieving operation which is performed continuously in industrial practice is intended to separate the noble substance which is defined as passing through a sieve with a given mesh opening which is selected in dependence on the granulometric distribution of the polymer or copolymer and the use for which it is intended, and the course substance which essentially comprises agglomerates of particles of resin, of lower commercial value, which is rejected at the sieve.

On an industrial scale however, it is not possible, under satisfactory economic conditions, to use a sieve having the same mesh opening as that of the sieve corresponding to the above-stated definition, as the polymer or copolymer does not have a sufficient sieving capability. The sieving capability of a polymer or copolymer is determined by its weight flow rate, in a continuous sieving process, through a sieve of a given mesh opening, per unit of sieving surface area. The mesh opening of the sieve which has to be used is larger and, all other things being equal, is increased in proportion to reduced sieving capability of the polymer or copolymer to be treated. By way of example, in order to produce, with a sufficient flow rate, the noble product which is defined as passing through a sieve with a mesh opening of 250 $\mu$m, it is necessary in industrial practice to use a sieve whose mesh opening is for example 320 $\mu$m. This results in coarse substance, normally rejected by a sieve having a mesh opening of 250 $\mu$m, also passing through the sieve with the noble substance.

OBJECTS OF THE INVENTION

The applicants have now found that it is possible, and it is the object of this invention, to produce bulk-prepared vinyl chloride-base polymers or copolymers which, while having an equally low residual vinyl chloride monomer content before they are brought into the free air, have better sieving capability than the polymers or copolymers produced by the above-described degassing process.

SUMMARY OF THE INVENTION

The polymers and copolymers which are degassed in accordance with the process of the invention, before being brought into the free air, have a residual vinyl chloride monomer content which is less than 50 mg/kg and generally less than 20 mg/kg and which can be down to 1 mg/kg.

The degassing process according to the invention makes it possible to produce vinyl chloride-base polymers or copolymers which enjoy a considerably enhanced sieving capability. Thus, the sieving capability of a given polymer or copolymer, expressed in tons per hour and per m² of sieving surface area, goes for example from 2 to 3 with a sieve having a mesh opening of 320 $\mu$m and from 0.5 to 3 with a sieve having a mesh opening of 250 $\mu$m.

The improvement provided by the process according to the invention is thus such that the process makes it possible, under more attractive economic conditions, to use a sieve with a mesh opening smaller than that of the sieves used hitherto, and even a seive having the same mesh opening as that of the sieve which corresponds to the above-stated definition of the noble substance and the coarse substance. This makes it possible to reduce and even eliminate the danger of coarse substance being carried through the sieve in the noble substance, and accordingly results in a noble substance of higher quality.

The process of the invention also has the advantage of totally eliminating the false refusal phenomenon which generally occurs in continuous industrial sieving.

Moreover, in vinyl chloride-base polymer and copolymer transformation industries, for reasons of certainty of supply, manufacturers are generally led to adopt a system of providing at least two resins of different origins, for feeding each production line, which resins may have been prepared either in bulk or in suspension. In that case, when such resins are supplied in loose form, manufacturers are often led to silo two resins of different origin in the same silo which is connected downstream to a pipeline conveyor installation, for example for pneumatic conveying of the material, which ensures a supply of resin to one or more manufacturing lines, or two silos which are connected downstream to the same conveyor installation. In such a case, it is generally found that the mixture of the resins caused to be formed in the single silo or in the conveyor installation which is common to the two silos, causes difficulties in regard to conveying the content of the silo or silos to the production line or lines. These difficulties may be such as to cause total break-down of the conveying process.

The process of the invention makes it possible to produce vinyl chloride-base polymers and copolymers, mixtures of which with polymers or copolymers based on vinyl chloride, of a different origin, which are prepared in mass or in suspension, do not give rise to the above-indicated disadvantage.

According to the process of the invention, with the polymerizate being maintained in an agitated condition, the monomer composition to be removed is adjusted from the polymerization pressure to an absolute pressure which is lower than 0.16 bar, the polymerisate is brought to or maintained at a temperature which is at least equal to 70° C. but below the temperature at which degradation of the polymer or copolymer begins, and said pressure and temperature conditions are maintained substantially until degassing stops, the polymerizate being brought into contact with water after the residual vinyl chloride monomer content of the polymer or copolymer has been reduced to below 2000 mg/kg.

According to the process of the invention, at least one anionic surface active agent is added to the water.

The applicants have found in fact that, by adding at least one anionic surface active agent to the water which is brought into contact with the polymerizate under the conditions of the process of the invention, the result is a polymer or copolymer which has an enhanced sieving capability. The applicants also found that the mixture formed by said polymer or copolymer and a polymer or copolymer of vinyl chloride base, from a different origin, which is prepared in bulk or in suspension, does not cause difficulties in regard to conveying said polymers or copolymers in a pipeline conveying installation.

The water generally represents from 0.5 to 3% by weight with respect to the polymer or copolymer.

The surface active agent generally represents from 0.001 to 0.3% and preferably from 0.01 to 0.1% by weight with respect to the polymer or copolymer.

The surface active agent generally represents from 0.1 to 20% by weight with respect to the water.

The addition to the polymerizate of water to which at least one anionic surface active agent is added may be performed one or more times.

The following may be mentioned as surface active agents suitable for use in the process of the invention: alkali fatty acid salts having from 6 to 22 carbon atoms alkali alkyl sulphates, hydroxyl alkali alkyl sulphates, alkali alkyl sulphonates, alkali alkylaryl sulphonates, alkali mono- and di-alkyl sulphosuccinates, alkali mono- and di-alkylphosphates, and the branched or straight chain alkyl radical generally containing from 4 to 18 carbon atoms. The following may be more particularly mentioned: sodium laurate, sodium myristate, sodium palmitate, sodium stearate, sodium laurylsulphate, sodium tetradecylsulphonate, sodium dodecylbenzenesulphonate, sodium dodecylphenoxybenzenesulphonate, sodium monooctylsulphosuccinate, sodium dibutylsulphosuccinate, sodium dihexylsulphosuccinate, sodium dioctylsulphosuccinate and sodium didodecylphosphate.

In accordance with an alternative form of the process of the invention, the polymerizate is brought into contact, during degassing, with an inert gas such as nitrogen, after the monomer composition to be removed has been adjusted to an absolute pressure of lower than 0.16 bar. The addition of inert gas to the polymerisate may be effected one or more times.

It will be appreciated that, the lower the flow rate in respect of degassing of the monomer composition, the longer will be the duration of the degassing step. The degassing flow rate is generally so regulated as to adjust the monomer composition to be eliminated from the polymerization pressure to an absolute pressure of about 4 bars, in from 20 to 60 minutes. Below that approximate pressure value, the monomer composition degassing flow rate is increased, with all other things being equal, in proportion to increasing polymerizate temperature. In order to reduce the degassing time, it is obviously advantageous for the polymerisate to be heated from the time degassing begins. The duration of the degassing operation is then generally between 60 and 150 minutes. After degassing is stopped, the polymers or copolymers are adjusted to atmospheric pressure by means of an inert gas, such as nitrogen before they are brought into the free air or the atmosphere, which is followed by the sieving operation.

EXAMPLES ILLUSTRATING THE INVENTION

A number of examples of bulk preparation of vinyl chloride-base polymers and copolymers, and performance of the degassing process in accordance with the present invention, are set out below.

Examples 1, 6, 11, 16 and 19 are given by way of comparison.

Examples 2, 3, 4, 5, 7, 8, 9, 10, 12, 13, 14, 15, 17, 18, 20 and 21 are in accordance with the invention.

The operations of sieving the resins are carried out continuously on a vibratory sieve with a surface area of 10 m² and the mesh opening as specified in each example.

The rate of false refusals which is achieved in the operation of sieving over a sieve of given mesh opening is determined by sieving, which is continued until exhaustion, of a sample of 15 kg of the substance which is refused at said sieve, over a sieve having the same mesh opening and a surface area of 0.28 m².

The AFNOR viscosity index of the vinyl chloride-base polymers and copolymers is determined in accordance with the standard NFT 51013.

The limit viscosity of the vinyl acetate and crotonic acid copolymers used in Examples 11 to 21 is determined in accordance with the method described in the French Pat. No. 77 27429 published under the No. 2 402 669.

EXAMPLES 1 TO 5

17.5 tons (t) of vinyl chloride is introduced into a stainless steel prepolymerizer with a capacity of 30 m³ and which is provided with an agitator means comprising a marine screw above which is disposed a turbine having six flat vanes. The apparatus is purged by degassing 1.5 t of vinyl chloride. 2.56 kg of ethyl peroxydicarbonate corresponding to 230 g of active oxygen, is also introduced into the apparatus. The speed of agitation is controlled to 108 rpm.

The temperature of the reaction mixture in the prepolymerizer is raised to and maintained at 66° C., which corresponds to a relative pressure of 10.8 bars in the prepolymerizer.

After 15 minutes of prepolymerization, with the rate of conversion being close to 10%, the prepolymerizate is transferred into a vertical stainless steel polymerizer which has a capacity of 50 m³ and which is provided with a double jacket and which has been previously purged by degassing 1 t of vinyl chloride and which contains 10.5 t of vinyl chloride, 1.78 kg of ethyl peroxydicarbonate corresponding to 160 g of active oxygen and 6.47 kg of lauroyl peroxide corresponding to 260 g of active oxygen. The polymerizer is provided with two independently operated agitators of the type described in copending U.S. Pat. No. 4,198,376, in which one agitator A comprises a strip wound in helical turns about a rotary shaft passing through the upper part of the polymerizer along the axis thereof, while the other B comprises two arms which are matched to the shape of the curved bottom of the polymerizer and connected to a spindle extending through the bottom of the polymerizer along the axis thereof. The speed of agitation of agitator A is adjusted to 25 rpm, and that of agitator B to 15 rpm. The temperature of the reaction mixture is rapidly brought to and maintained at 70° C., which corresponds to a relative pressure of 11.9 bars in the polymerizer.

After polymerization for 3.5 hours at 70° C., the temperature of the water circulating in the double jacket of the polymerizer is brought to 75° C., and degassing of the polymer is effected, with recovery of the monomer in the reservoir provided for the purpose, which contains vinyl chloride monomer at an absolute pressure of 4 bars.

The monomer to be removed is first adjusted to an absolute pressure of 4 bars by direct degassing over a period of 50 minutes and then, by means of a compressor with an intake in the polymerizer and a discharge in a cooler condenser which supplies said reservoir, it is adjusted to an absolute pressure of 0.15 bar.

When the residual vinyl chloride monomer content of the polymer present in the polymeriser falls below 2000 mg/kg, which occurs 30 minutes after the compressor is set in operation, water is introduced into the polymerizer.

In example 1, 160 kg of water is introduced.

In example 2, 160 kg of water is introduced, to which 250 g of sodium dodecylbenzenesulphonate is added.

In example 3, 160 kg of water is introduced, to which 250 g of sodium myristate is added.

In Example 4, 160 kg of water is introduced, to which 250 g of sodium palmitate is added.

In example 5, 160 kg of water is introduced, to which 250 g of sodium stearate is added.

The absolute pressure in the polymerizer is again adjusted to 0.15 bar and maintained at that value until degassing is stopped.

The temperature of the polymerisate, which has risen to 75° C., ten minutes after the water is circulated at 75° C. in the double jacket of the polymerizer, is maintained at 75° C. until degassing is stopped. The duration of the degassing step is 120 minutes.

After degassing and breaking of the vacuum with nitrogen, 16.7 t of polyvinyl chloride is collected.

EXAMPLES 6 TO 10

The apparatus is the same as that used in examples 1 to 5.

16.5 t of vinyl chloride is introduced into the prepolymerizer and the apparatus is purged by degassing 1.5 t of vinyl chloride. 300 kg of vinyl acetate and 2.56 kg of ethyl peroxydicarbonate, corresponding to 230 g of active oxygen, are also introduced. The speed of agitation is adjusted to 85 rpm.

The temperature of the reaction medium in the prepolymerizer is raised to and maintained at 69° C., which corresponds to a relative pressure of 11.4 bars in the prepolymerizer.

After 15 minutes of prepolymerization, with the conversion rate being close to 8%, the prepolymerizate is transferred into the polymerizer which has been previously purged by degassing 1 t of vinyl chloride and which contains 10 t of vinyl chloride, 200 kg of vinyl acetate, 3.61 kg of acetylcyclohexanesulphonyl peroxide, corresponding to 260 g of active oxygen, and 4.90 kg of ethyl peroxydicarbonate corresponding to 440 g of active oxygen. The speed of agitation of the agitator A is controlled to 25 rpm and that of the agitator B is controlled to 15 rpm. The temperature of the reaction medium is rapidly brought to and maintained at 55° C., which corresponds to a relative pressure of 8.1 bars in the polymerizer.

After polymerization for 4.25 hours at a temperature of 55° C., the temperature of the water circulating in the double jacket of the polymerizer is brought to 75° C., and degassing of the copolymer is effected.

The monomer composition to be removed is firstly adjusted to an absolute pressure of 4 bars by direct degassing over a period of 50 minutes, and then, by means of the compressor, it is adjusted to an absolute pressure of 0.15 bar.

When the residual vinyl chloride monomer content of the copolymer present in the polymerizer falls below 2000 mg/kg, which occurs 30 minutes after the compressor is set in operation, water is introduced into the polymerizer.

In example 6, 400 kg of water is introduced.

In example 7, 400 kg of water is introduced, to which 10 kg of sodium tetradecylsulphonate is added.

In example 8, 400 kg of water is introduced, to which 5 kg of sodium laurate is added.

In example 9, 400 kg of water is introduced, to which 10 kg of sodium monooctylsulphosuccinate is added.

In example 10, 400 kg of water is introduced, to which 5 kg of sodium dibutylsulphosuccinate is added.

The absolute pressure in the polymerizer is again adjusted to 0.15 bar and maintained at that value until degassing stops.

The temperature of the polymerizate, which has risen to 75° C. ten minutes after the water is circulated at a temperature of 75° C. in the double jacket of the polymerizer, is maintained at a temperature of 75° C. until degassing stops. The duration of the degassing operation is 120 minutes.

After degassing and breaking the vacuum by means of nitrogen, 20.3 t of the copolymer is collected, comprising 99% by weight of vinyl chloride and 1% by weight of vinyl acetate.

EXAMPLES 11 TO 15

The apparatus is the same as that used in examples 1 to 5.

17.5 t of vinyl chloride is introduced into the prepolymerizer and the apparatus is purged by degassing 1.5 t of vinyl chloride. Also introduced into the apparatus are 2.56 kg of ethyl peroxydicarbonate, corresponding to 230 g of active oxygen, and 1600 g of a 40% by weight solution in propanol of a copolymer of vinyl acetate and crotonic acid comprising 94% by weight of vinyl acetate and 6% by weight of crotonic acid, with a limit viscosity of 0.187. The speed of agitation is controlled at 95 rpm.

The temperature of the reaction medium in the prepolymerizer is raised to and maintained at 66° C., which corresponds to a relative pressure of 10.8 bars in the prepolymerizer.

After 15 minutes of prepolymerization, with the conversion rate being close to 10%, the prepolymerizate is transferred into the polymerizer which has been previously purged by degassing 1 t of vinyl chloride and which contains 9 t of vinyl chloride, 6.94 kg of acetylcyclohexane sulphonyl peroxide, corresponding to 500 g of active oxygen, and 1.89 kg of ethyl peroxydicarbonate, corresponding to 170 g of active oxygen. The speed of agitation of agitator A is controlled at 25 rpm and that of agitator B at 15 rpm. The temperature of the reaction medium is rapidly brought to and maintained at 45° C., which corresponds to a relative pressure of 6.3 bars in the polymerizer.

After polymerization at 45° C. for 5.25 hours, the temperature of the water circulating in the double jacket of the polymerizer is brought to 70° C. and degassing of the polymer is effected, with recovery of the monomer in the reservoir provided for that purpose, which contains vinyl chloride monomer at an absolute pressure of 4 bars.

The monomer to be removed is first adjusted to an absolute pressure of 4 bars by a direct degassing over a period of 50 minutes and then, by means of the compressor, it is adjusted to an absolute pressure of 0.15 bar.

When the residual vinyl chloride monomer content of the polymer present in the polymerizer falls below 2000 mg/kg, which occurs 30 minutes after the compressor is set in operation, water is introduced into the polymerizer.

In example 11, 96 kg of water is introduced.

In example 12, 96 kg of water is introduced, to which 3.2 kg of sodium laurylsulphate is added.

In example 13, 96 kg of water is introduced, to which 6.4 kg of sodium dioctylsulphosuccinate is added.

In example 14, 96 kg of water is introduced, to which there are added 1.6 kg of sodium laurylsulphate and 3.2 kg of sodium dioctylsulphosuccinate.

In example 15, 96 kg of water is introduced, to which 5 kg of sodium dihexylsulphosuccinate is added.

The absolute pressure in the polymerizer is again adjusted to 0.15 bar and maintained at that value until degassing stops.

The temperature of the polymerizate, which rose to 70° C. ten minutes after the water was set circulating at a temperature of 70° C. in the double jacket of the polymerizer is maintained at 70° C. until degassing stops. The duration of the degassing operation is 120 minutes.

After degassing and breaking the vacuum by means of nitrogen, 16 t of polyvinyl chloride is collected.

In examples 1 to 15, the noble or desirable substance is defined as passing a sieve with a mesh opening of 250 μm.

In order to demonstrate the differences in sieving performance of the resins which are degassed in examples 2 to 5, 7 to 10 and 12 to 15 in accordance with the invention, and in the corresponding comparative examples 1, 6 and 11, two sieving operations are performed in respect of each example, each sieving operation using an amount of 8 t of resin, by means of a sieve with a mesh opening of 250 μm and a sieve with a mesh opening of 320 μm respectively.

Table 1 indicates, for each of examples 1 to 15, the residual vinyl chloride monomer content as determined after degassing in respect of the resin present in the polymerizer before it is brought into contact with the atmospheric air, the results relating to the sieving operations, as well as the AFNOR viscosity index, the apparent density and the mean diameter of the resin particles as determined in respect of the noble substance.

TABLE 1

|  | Comparative example 1 | Examples of the invention 2 to 5 | Comparative example 6 | Examples of the invention 7 to 10 | Comparative example 11 | Examples of the invention 12 to 15 |
| --- | --- | --- | --- | --- | --- | --- |
| Residual vinyl chloride monomer content (mg/kg) Sieve with mesh opening 250 μm | 40 | 40 | 20 | 20 | 2 | 2 |
| Proportion by weight of substance passing through the sieve (%) | 97 | 98.3 | 96.5 | 98.1 | 97 | 98.3 |
| Proportion by weight of refusal (%) | 1.3 | nil | 1.6 | nil | 1.3 | nil |
| sieving capability | 0.65 | 3 | 0.5 | 3 | 0.4 | 2.6 |

TABLE 1-continued

|  | Comparative example 1 | Examples of the invention 2 to 5 | Comparative example 6 | Examples of the invention 7 to 10 | Comparative example 11 | Examples of the invention 12 to 15 |
|---|---|---|---|---|---|---|
| (tons)/(hour·M²) |  |  |  |  |  |  |
| Sieve with mesh opening 320 μm |  |  |  |  |  |  |
| Proportion by weight of substance passing through the sieve (%) | 98 | 98.3 | 98 | 98.1 | 98 | 98.3 |
| proportion by weight of rejection (%) | 0.3 | nil | 0.1 | nil | 0.3 | nil |
| Sieving capability (t)/(h·m2) | 2 | 3 | 2 | 3 | 1.5 | 2.8 |
| FOR viscosity index | 78 | 78 | 102 | 102 | 144 | 144 |
| apparent density (g/cm³) | 0.60 | 0.60 | 0.59 | 0.59 | 0.54 | 0.54 |
| in particle diameter (μm) | 100 | 100 | 135 | 135 | 120 | 120 |

It will be seen from Table 1 that:

(a) the sieving capability as determined with a sieve with a mesh opening of 250 μm, in respect of the resins which are degassed in comparative examples 1, 6 and 11 is insufficient to permit the use of a sieve with a mesh opening of 250 μm under satisfactory economic conditions, which means it is necessary to use a sieve with a mesh opening of 320 μm. This results in the danger of coarse substance being passed through the sieve with the noble substance.

(b) The sieving capability as determined with either of the two sieves, in respect of the resins which are degassed in examples 2 to 5, 7 to 10 and 12 to 15 in accordance with the invention, is much better than that of the degassed resins of corresponding comparative examples 1, 6 and 11.

(c) The improvement achieved by the process according to the invention is such that the sieving capability, as determined on a sieve with a mesh opening of 250 μm, of the degassed resins of examples 2 to 5, 7 to 10 and 12 to 15 of the invention, is better than the sieving capability, as determined with a sieve with a mesh opening of 320 μm, of the degassed resins of corresponding comparative examples 1, 6 and 11. It follows from this that the process of the invention makes it possible to use a sieve with a mesh opening of 250 μm and therefore to operate without the danger of coarse substance being passed through the sieve in the noble substance, under economic conditions which are more attractive than those encountered when performing the operation of sieving degassed resins of the corresponding comparative examples with a sieve having a mesh opening of 320 μm.

(d) The process of the invention eliminates false rejection at both of the two sieves.

EXAMPLES 16 to 21

The apparatus used is the same as that used in examples 1 to 5, except as regards the sieving operation, as indicated in greater detail hereinafter.

17.5 t of vinyl chloride is introduced into the preopolymeriser, and the apparatus is purged by degassing 1.5 t of vinyl chloride. Also introduced are 979 g of ethyl peroxydicarbonate, corresponding to 88 g of active oxygen, 999 g of acetylcyclohexanesulphonyl peroxide, corresponding to 72 g of active oxygen and 1600 g of a 40% by weight solution in propanol of a copolymer of vinyl acetate and crotonic acid which comprises 94% by weight of vinyl acetate and 6% by weight of crotonic acid, with a limit viscosity of 0.187. The speed of agitation is controlled at 300 rpm.

The temperature of the reaction medium in the prepolymerizer is raised to 45° in 1.5 hours, which corresponds to a relative pressure of 6 bars, and then to 66° C. in 20 minutes, corresponding to a relative pressure of 11 bars in the prepolymerizer.

After prepolymerization at a temperature of 66° C. for 5 minutes, with the conversion rate being close to 7%, the prepolymerizate is transferred into the polymerizer which has been previously purged by degassing 1 t of vinyl chloride and which contains 8 t of vinyl chloride, 1335 g of ethyl peroxydicarbonate, corresponding to 120 g of active oxygen, and 17.31 kg of lauroylperoxide, corresponding to 696 g of active oxygen. The speed of agitation of agitator A is controlled at 25 rpm and that of agitator B at 15 rpm. The temperature of the reaction mixture is brought to 64° C. in 1 hour, corresponding to a relative pressure of 10.2 bars in the polymerizer, and then to 70° C. in 2 hours, which corresponds to a relative pressure of 11.9 bars in the polymerizer.

After polymerization at a temperature of 70° C. for 3 hours, the temperature of the water circulating in the double jacket of the polymerizer is brought to 75° C. and degassing of the polymer is effected, with recovery of the monomer in the reservoir provided for that purpose, which contains vinyl chloride monomer at an absolute pressure of 4 bars.

The monomer to be removed is first adjusted to an absolute pressure of 4 bars by direct degassing over a period of 50 minutes and then, by means of the compressor, it is adjusted to an absolute pressure of 0.15 bar.

When the residual vinyl chloride monomer content of the polymer present in the polymerizer falls below 2000 mg/kg, which occurs 30 minutes after the compressor is set in operation, water is introduced into the polymerizer.

In example 16, 500 kg of water is introduced.

In example 17, 500 kg of water is introduced, to which 15 kg of sodium dodecylbenzenesulphonate is added.

In example 18, 500 kg of water is introduced, to which 42 kg of sodium dodecylphenoxybenzenesulphonate is added.

In example 19, 200 kg of water is introduced.

In example 20, 200 kg of water is introduced, to which 38 kg of sodium didodecylphosphate is added.

In example 21, 200 kg of water is introduced, to which 19 kg sodium dodecylbenzenesulphonate and 19 kg of sodium didodecylphosphate are added.

The absolute pressure in the polymerizer is again adjusted to 0.15 bar and maintained at that value until degassing stops.

The temperature of the polymerizate, which rose to 75° C. 10 minutes after the water was set in circulation at a temperature of 75° C. in the double jacket of the polymerizer, is maintained at 75° C. until degassing stops. The duration of the degassing operation is 150 minutes.

After degassing and breaking the vacuum by means of nitrogen, 16.8 t of polyvinyl chloride is collected.

In examples 16 to 21, the noble substance is defined as passing a sieve with a mesh opening of 125 µm.

In order to demonstrate the differences in sieving performance of the resin which is degassed in examples 17, 18, 20 and 21 according to the invention, and in the corresponding comparative examples 16 and 19, two sieving operations are performed in respect of each example, each sieving operation using an amount of 8 t of resin, by means of a sieve with a mesh opening of 125 µm and a sieve with a mesh opening of 250 µm respectively.

Table 2 indicates, for each of examples 16 to 21, the residual vinyl chloride monomer content as determined after degassing in respect of the resin present in the polymerizer before it is brought into the free air, the results relating to the sieving operations, as well as the AFNOR viscosity index, the apparent density and the mean diameter of the resin particles as determined in respect of the noble substance.

TABLE 2

|  | Comparative examples 16 and 19 | Examples of the invention 17, 18, 20 and 21 |
|---|---|---|
| Residual vinyl chloride monomer content (mg/kg) | 45 | 45 |
| Sieve with mesh opening of 125 µm |  |  |
| proportion by weight of substance passing through the sieve (%) | nil | 94.5 |
| proportion by weight of false refusal (%) | 94.5 | nil |
| sieving capability $\frac{(t)}{h \cdot m2}$ | nil | 0.3 |
| Sieve with mesh opening of 250 µm |  |  |
| proportion by weight of substance passing through the sieve (%) | 90 | 94.5 |
| proportion by weight of false refusal (%) | 4.5 | nil |
| sieving capability $\frac{(t)}{h \cdot m2}$ | 0.065 | 0.3 |
| AFNOR viscosity index | 78 | 78 |
| Apparent density (g/cm$^3$) | 0.68 | 0.68 |
| Mean particle diameter (µm) | 55 | 55 |

It will be seen from Table 2 that:

(a) The sieving capability, as determined with a sieve with a mesh opening of 125 µm, in respect of the resin degassed in comparative examples 16 and 19 is nil, which means that it is necessary to use a sieve with a mesh opening of 250 µm. This results in the danger of coarse substance being passed through the sieve in the noble substance.

(b) The sieving capability as determined with either of the two sieves, in respect of the resin degassed in examples 17, 18, 20 and 21 in accordance with the invention, is much better than that of the degassed resin of corresponding comparative examples 16 and 19.

(c) The improvement achieved by the process according to the invention is such that the sieving capability, as determined on a sieve with a mesh opening of 125 µm, of the degassed resin of examples 17, 18, 20 and 21 in accordance with the invention is better than the sieving capability, as determined with a sieve with a mesh opening of 250 µm, of the degassed resin of corresponding comparative examples 16 and 19. It follows from this that the process of the invention makes it possible to use a sieve with a mesh opening of 125 µm, and therefore to operate without the danger of coarse substance being passed through the sieve in the noble substance, under economic conditions which are more attractive than those encountered when performing the operation of sieving degassed resin of the corresponding comparative examples with a sieve having a mesh opening of 250 µm.

(d) The process of the invention eliminates false rejection at both of the two sieves.

We claim:

1. A process for degassing polymers and copolymers prepared by bulk polymerization of a vinyl chloride-based monomer composition comprising the steps of:
   (1) adjusting the absolute pressure of the polymerizate to below 0.16 bar while maintaining the polymerizate in an agitated condition and adjusting the temperature to at least 70° C. but below the temperature at which the degradation of the polymer or copolymer begins to degas the polymer;
   (2) contacting, after the residual monomer content of the polymer or copolymer has been reduced to below 2000 mg/kg, the polymerizate with water constituting between 0.5 to 3% by weight based on the weight of the polymer or copolymer, said water containing at least one anionic surface acting agent in an amount within the range of 0.001 to 0.3% by weight based on the weight of the polymer or copolymer and 0.1 to 20% by weight based on the weight of the water.

2. A process as claimed in claim 1 wherein the surface active agent is selected from the group consisting essentially of alkali salts of fatty acid comprising from 6 to 22 carbon atoms, alkali alkyl sulphates, hydroxyl alkali alkyl sulphates, alkali alkyl sulphonates, alkali alkylaryl sulphonates, alkali mono- and di-alkylsulphosuccinates, alkali mono- and di-alkylphosphates, and in which the alkyl group includes branched or straight chain alkyl radicals containing from 4 to 18 carbon atoms.

3. A process as claimed in claim 1, in which the surface active agent is selected from the group consisting essentially of sodium laurate, sodium myristate, sodium palmitate, sodium stearate, sodium laurylsulphate, sodium tetradecylsulphonate, sodium dodecylbenzenesulphonate, sodium dodecylphenoxybenzenesulphonate, sodium monooctylsulphosuccinate, sodium dibutylsulphosuccinate, sodium dihexylsulphosuccinate, sodium dioctylsulphosuccinate and sodium diododecylphosphate.

4. A process as claimed in claim 1 in which the surface active agent is present in an amount within the range of 0.01 to 0.1% by weight with respect to the polymer or copolymer.

* * * * *